(12) United States Patent
Lee et al.

(10) Patent No.: US 8,760,270 B2
(45) Date of Patent: Jun. 24, 2014

(54) INTERCOM SYSTEM CONTROLLING METHOD

(75) Inventors: Hou-Hsien Lee, New Taipei (TW);
Chang-Jung Lee, New Taipei (TW);
Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 291 days.

(21) Appl. No.: 13/245,878

(22) Filed: Sep. 27, 2011

(65) Prior Publication Data

US 2012/0161947 A1 Jun. 28, 2012

(30) Foreign Application Priority Data

Dec. 28, 2010 (TW) .................................. 099146256

(51) Int. Cl.
*G08B 3/00* (2006.01)

(52) U.S. Cl.
USPC ................... 340/311.2; 340/5.7; 340/286.06; 348/155; 348/441

(58) Field of Classification Search
USPC .............. 340/311.2, 5.26, 5.7, 3.1, 528, 531, 340/286.02, 286.06, 286.11; 379/167.01, 379/159; 455/90.2, 187.1; 348/155, 441
See application file for complete search history.

(56) References Cited

U.S. PATENT DOCUMENTS

| | | | |
|---|---|---|---|
| 2007/0064897 A1* | 3/2007 | Lee | 379/159 |
| 2008/0061923 A1* | 3/2008 | Simon et al. | 340/3.1 |
| 2008/0064352 A1* | 3/2008 | Kuo | 455/187.1 |
| 2009/0273438 A1* | 11/2009 | Sultan et al. | 340/5.7 |
| 2012/0028589 A1* | 2/2012 | Fan et al. | 455/90.2 |
| 2013/0010120 A1* | 1/2013 | Nnoruka | 348/155 |

* cited by examiner

*Primary Examiner* — Brent Swarthout
(74) *Attorney, Agent, or Firm* — Novak Druce Connolly Bove + Quigg LLP

(57) ABSTRACT

An intercom system controlling method stores intercom system location information in an electronic device, and sets a reply interface which is displayed on a screen to provide alert messages and operable buttons regarding different communication statuses between the electronic device and an intercom system, which has an outdoor installed at an entrance of a building and an indoor intercom installed with the building. After receiving a request data packet that is generated and sent by a network device of the intercom system, the method displays the intercom system location information, the alert messages and operable buttons of a waiting-for communication status on the reply interface.

16 Claims, 5 Drawing Sheets

INTERCOM SYSTEM CONTROLLING METHOD

BACKGROUND

1. Technical Field

The present disclosure relates to intercom systems and methods, and more particularly, to a method for controlling an intercom system remotely over a network.

2. Description of Related Art

Intercom systems can let users monitor building entrances, talk to visitors, view real-time images of the visitors, and control locks of the entrance to the building. Often, the intercom system includes an outdoor intercom and an indoor intercom. When a visitor uses the outdoor intercom, a doorbell and video monitor can be activated, and a user can view the visitor in real time and communicate with the visitor using the indoor intercom and unlock the entrance. Unfortunately, intercom systems can also be a security weakness in that visitors can determine an occupants schedule by regularly using the intercom to find out when the users are or are not home for example.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
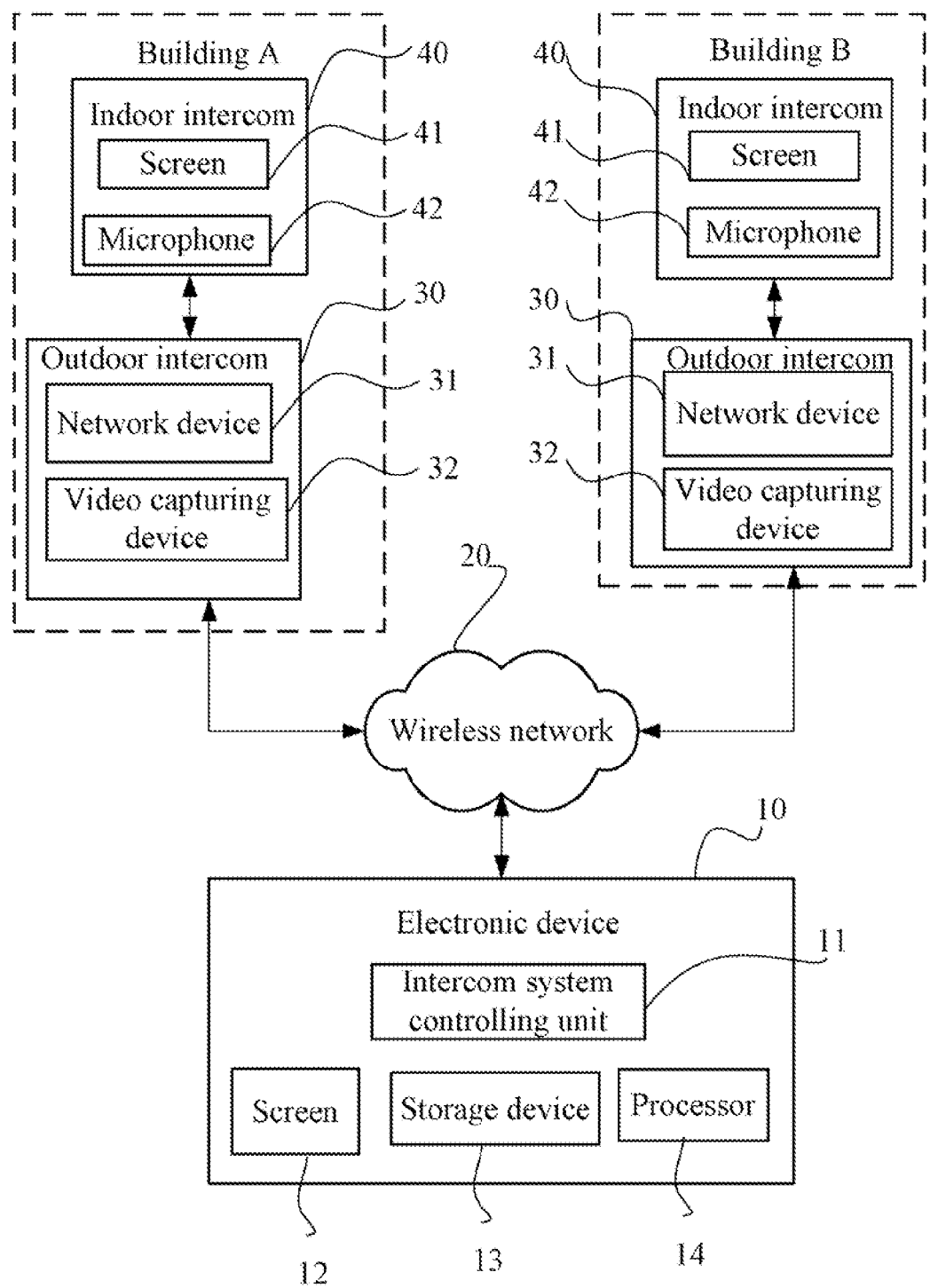
FIG. 1 is a block diagram of one embodiment of an application environment of an intercom system controlling method.

FIG. 1 is a block diagram of one embodiment of an application environment of an intercom system controlling method. In one embodiment, the intercom system includes an outdoor intercom 30 positioned at an entrance of a building, such as a building A or a building B, and an indoor intercom 40 positioned within the building. The intercom system includes a network device 31. In this embodiment, the network device 31 is included within the outdoor intercom 30. In other embodiments, the network device 31 may be included anywhere within the intercom system, such as the indoor intercom 40. The indoor intercom 40 includes a screen 41 and a microphone 42. The outdoor intercom 30 includes a video capturing device 32 and communicates with the indoor intercom 40 wirelessly or via cables, for functions such as transmitting sounds and images of visitors at the entrance, which are captured by the video capturing device 32 to the indoor intercom 40. A user at the indoor intercom 40 can view the images displayed on the screen 41, and talk with the visitors after activating the microphone 42.

In one embodiment, the network device 31 includes firmware that mediates data packets in a computer network. The network device is allocated an Internet protocol (IP) address by the computer network. If the outdoor intercom 30 is activated but receives no signal from the indoor intercom 40 within a preset time, such as when nobody is home or available to use the indoor intercom 40, the network device 31 establishes communication with the outdoor intercom 30 and an electronic device 10 of a designated user via a wireless network 20, and transmits sounds and images from the outdoor intercom 30 to the electronic device 10. This way, even though users may be away from the location of the indoor intercom 40, the designated user or users can receive any signals output from the outdoor intercom 30 and control functions of the outdoor intercom 30 remotely, such as engaging in conversation with the visitors, via the electronic device 10.

Depending on the embodiment, the network device 31 may be a network card, a router, a modem, or any other suitable device. The wireless network may be a general packet radio service (GPRS) network, a wideband code division multiple access (WCDMA) network, a wireless local network (WLAN), or any other kind of network. The electronic device 10 may be a mobile phone, a personal digital assistant (PDA), or any other electronic device that has network communication functions.

Figure 2:
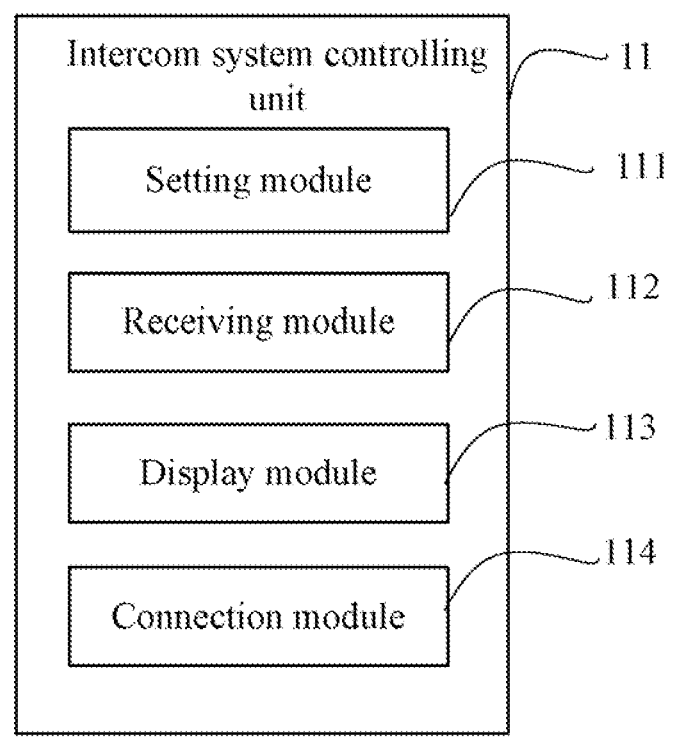
FIG. 2 is a block diagram of one embodiment of function modules of a network enabled intercom system in an electronic device.

In one embodiment, the electronic device 10 further includes an intercom system controlling unit 11, a storage device 13, and a processor 14. As shown in FIG. 2, the intercom system controlling unit 11 includes a plurality of function modules, such as a setting module 111, a receiving module 112, a display module 113, and a connection module 114. The modules 111-114 may comprise computerized code in the form of one or more programs (computer-readable program code) that are stored in the storage device 13. The computerized code includes instructions that are executed by the processor 14 to provide the below-described functions of the modules 111-114 illustrated in FIG. 3. The storage system 14 may be a cache or a memory, such as an EPROM, HDD, or flash memory.

Figure 3:
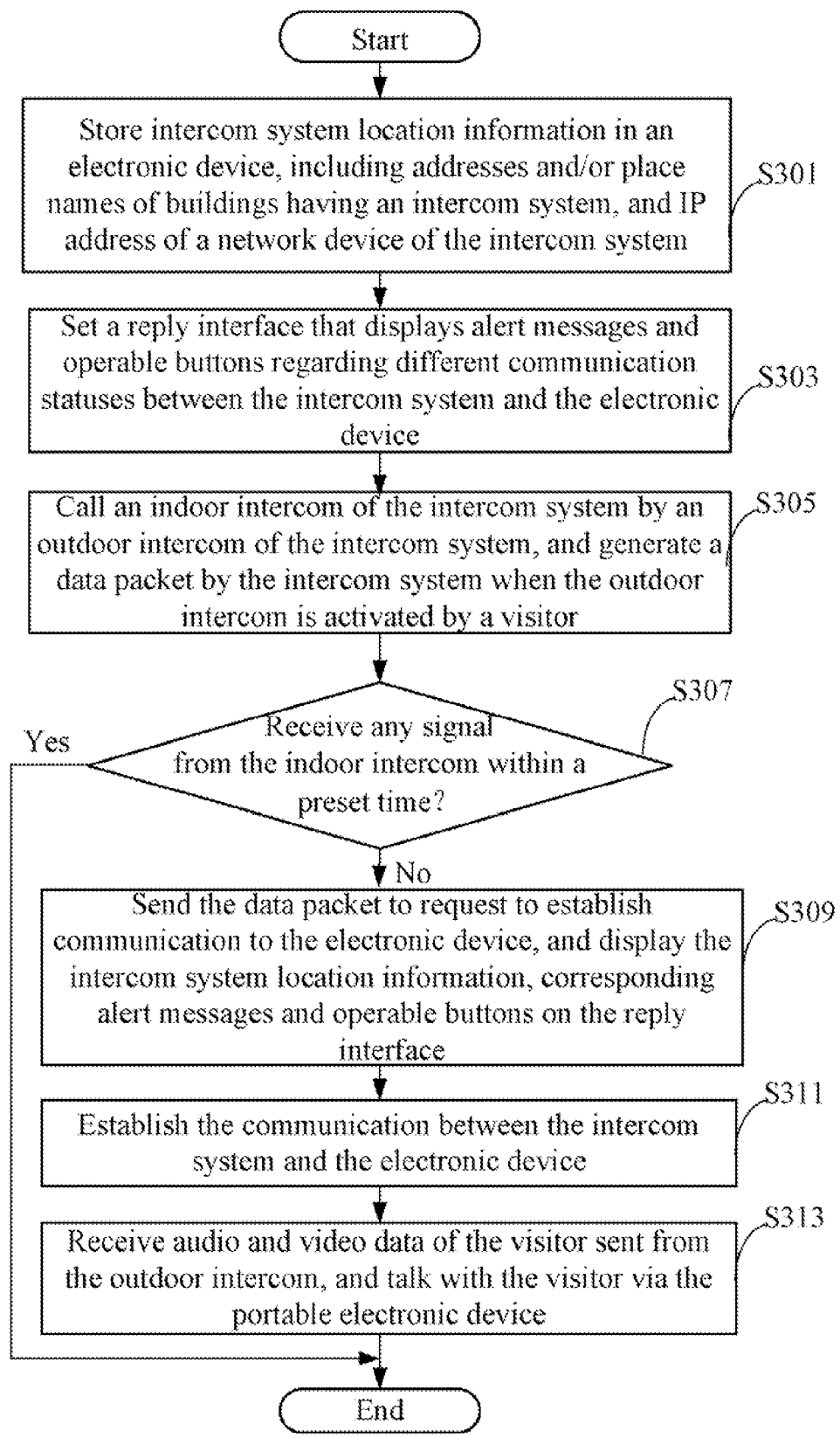
FIG. 3 is a flowchart of one embodiment of the intercom system controlling method.

FIG. 3 is a flowchart of one embodiment of the intercom controlling method. Depending on the embodiment, additional blocks may be added, others removed, and the ordering of the blocks may be changed.

Figure 4:
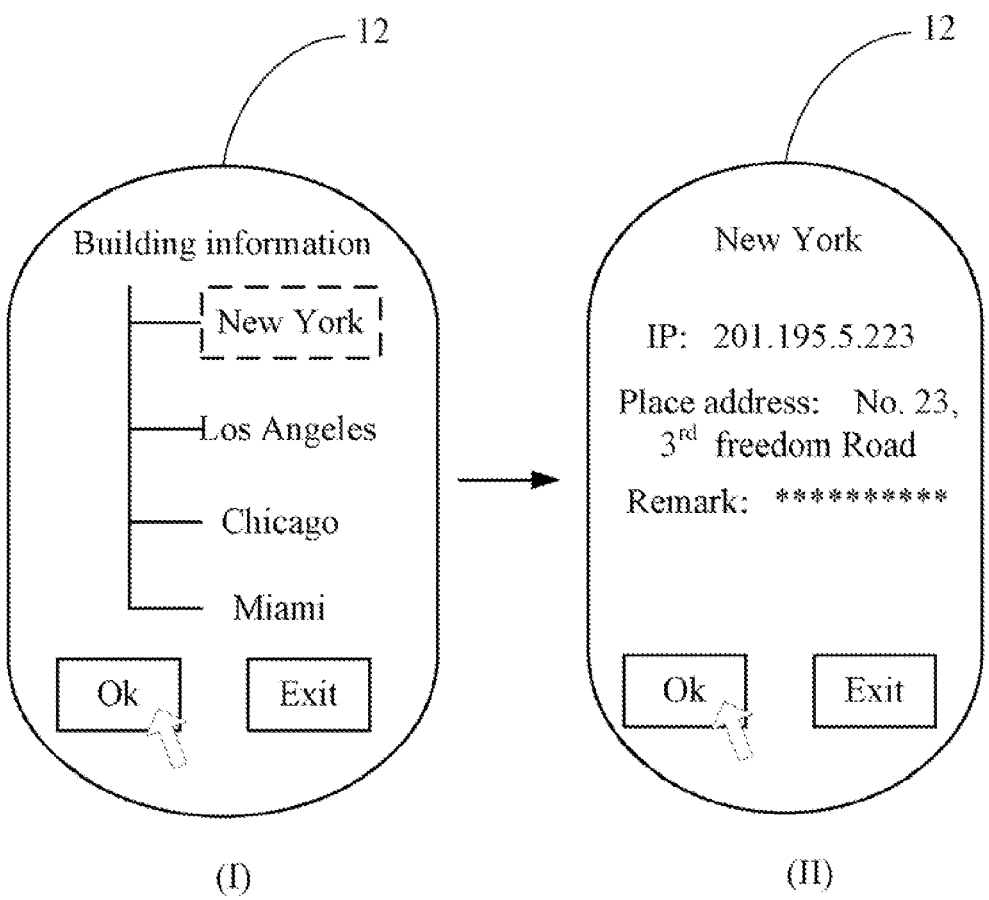
FIG. 4 illustrates examples of setting intercom system location information on the electronic device.

In block S301, the setting module 111 stores location information of where intercom systems are positioned (hereinafter "intercom system location information") input by a user of the electronic device 10. In one embodiment, the intercom system location information may include addresses and/or place names of different buildings having the intercom system, such as "New York," "Los Angeles," "Chicago," and "Miami," as shown in FIG. 4(I). The intercom system location information further includes the IP address of each of the corresponding network devices 31.

In block S303, the setting module 111 sets a reply interface, which is displayed on the screen 12 to provide alert messages and operable buttons regarding different communication statuses between the outdoor intercom 30 and the electronic device 10. The reply interface also displays real-time images of a visitor that is captured by the video capturing device 32 of the outdoor intercom 30.

Figure 5:
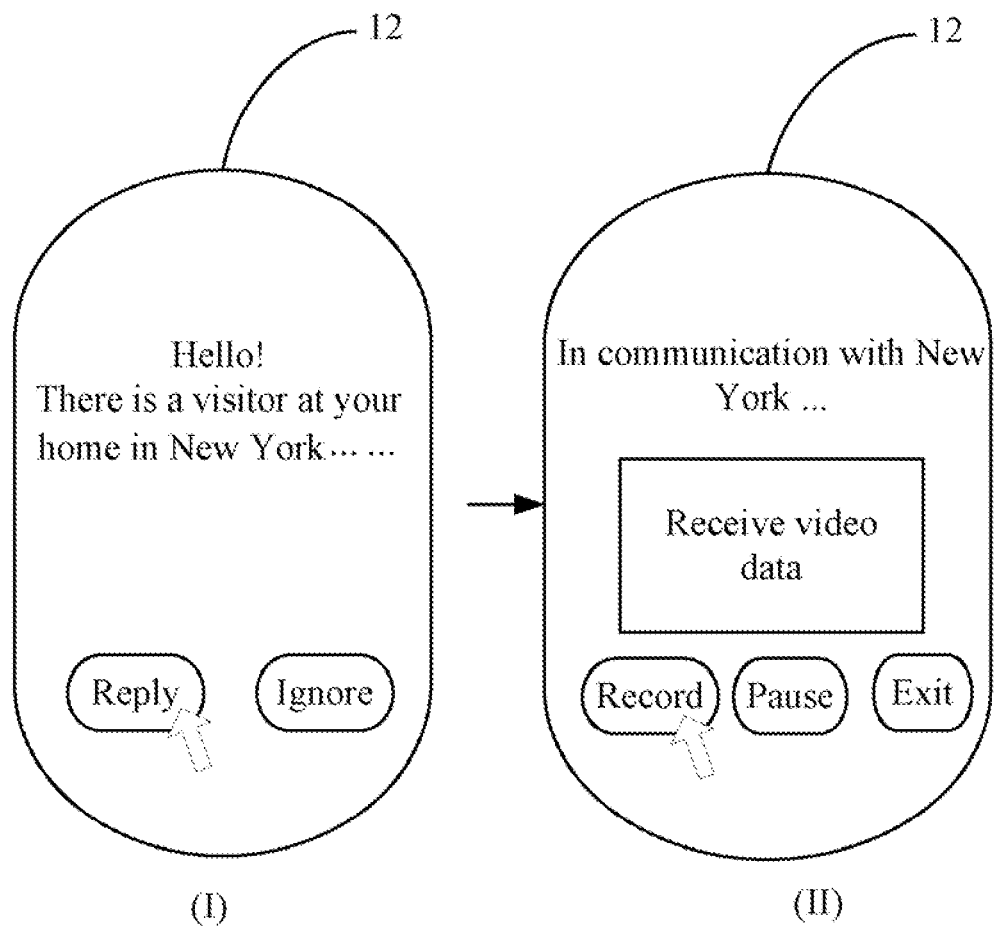
FIG. 5 illustrates information displayed on a reply interface of the electronic device when a visitor activates an outdoor intercom.

In one embodiment, the different communication statuses may include a waiting-for communication status, a communication status, an interruption status, and an ending status. For example, if the electronic device 10 receives a request to establish communication from the outdoor intercom 30 at the New York building, the outdoor intercom 30 and the electronic device 10 are in the waiting-for communication status, as shown in FIG. 5(I), the alert message may be "Hello! There is a visitor at your home in New York . . . ", the operable buttons may include a "Reply" button and an "Ignore" button. If the user activates the "Reply" button to accept the request, the outdoor intercom 30 and the electronic device 10 enter into the communication status, as shown in FIG. 5(II), the alert message may be "In communication with New York . . . ," the operable buttons may include a "Record" button, a "Pause" button, and an "Exit" button. If the user activates the "Pause" button, communication between the outdoor intercom 30 and the electronic device 10 is temporarily suspended, and the alert message may be "Communication paused." If the user activates the "Exit" button to end the communication, communication between the outdoor intercom 30 and the electronic device 10 is ended, and the alert message may be "Communication over." The setting module 111 also stores the setting information into the storage device 13.

In block S305, when the outdoor intercom 30 of the building (e.g., the New York building) is triggered by a visitor, the outdoor intercom 30 calls the indoor intercom 40 of the building and generates a request data packet. The request data packet includes the IP address of the network device 31 and a network address of the electronic device 10. In one embodiment, the network address may be defined as an IP address, a main access control (MAC) address of the electronic device, or just a phone number if the electronic device is a mobile phone.

In block S307, the outdoor intercom 30 determines if any signal sent from the indoor intercom 30 has been received within a preset time (such as 30 seconds). If the pick-up signal sent from the indoor intercom 30 has been received within the preset time, the intercom system establishes the communication with the indoor intercom 30, and the procedure ends. Otherwise, if no signal has been received within the preset time, the procedure goes to block S309.

In block S309, the outdoor intercom 30 sends the request data packet to the electronic device 10 according to the network address of the electronic device 10, to request establishing communication with the electronic device 10. After the receiving module 112 has received the request data packet sent from the outdoor intercom 30, the display module 113 displays the intercom system location information associated with the IP address of the network device 31 of the outdoor intercom 30, and displays the alert message and operable buttons of the waiting-for communication status (as shown in FIG. 5(I)) on the reply interface, which is displayed on the screen 12 of the electronic device 10.

In block S311, the connection module 114 establishes the communication with the outdoor intercom 30 and the electronic device 10 in response that the electronic device 10 accepts the request to establish the communication. For example, if the "Reply" button displayed on the reply interface is activated by the user, the connection module 114 starts to establish the communication. Alternatively, the user may refuse the request by operating the "Ignore" button.

In block S313, the receiving module 112 receives audio and video data of the visitor, which are captured and sent by the video capturing device 32 of the outdoor intercom 30. The display module 113 plays the video and audio data on the reply interface, and displays operable buttons of the communication status for the user to deal with the communication. For example, the user may talk with the visitor via the device 10, and record the audio and video data during the talk by operating the "Record" button. Selectively, the user may interrupt the communication temporarily by operating the "Stop" button, or end the communication by operating the "Exit" button.

Although certain embodiments of the present disclosure have been specifically described, the present disclosure is not to be construed as limited thereto. Various changes or modifications may be made to the present disclosure without departing from the scope and spirit of the present disclosure.

What is claimed is:

1. An intercom system controlling method being performed by execution of computer readable program code by a processor of an electronic device, the method comprising:
storing intercom system location information in a storage device of the electronic device, wherein: the intercom system location information comprises addresses and place names of buildings that comprise an intercom system, the intercom system comprising an indoor intercom positioned within a building, an outdoor intercom positioned at an entrance of the building, and an IP address of a network device of the intercom system;
setting a reply interface, displayed on a screen of the electronic device, to provide different alert messages and operable buttons regarding different communication statuses between the intercom system and the electronic device;
receiving a request data packet of a request to establish communication with the electronic device, wherein the request data packet is generated and sent by the network device of the intercom system, the request data packet comprising the IP address of the network device and a network address of the electronic device; and
displaying the intercom system location information associated with an IP address of the network device contained in the request data packet, and corresponding alert messages and operable buttons on the reply interface.

2. The method of claim 1, wherein the different communication statuses between the intercom system and the electronic device comprise a waiting-for communication status before the electronic device accepts the request to establish the communication, and a communication status after the electronic device accepts the request to establish the communication.

3. The method of claim 2, wherein the operable buttons comprise buttons regarding the waiting-for communication status that allow the user to accept or refuse the request to establish the communication.

4. The method of claim 3, further comprising:
establishing the communication between the intercom system and the electronic device to enter into the communication status, in response that the electronic device accepts the request to establish the communication; and
receiving audio data and video data of a visitor positioned at the entrance of the building which are captured and sent by the outdoor intercom, playing the audio data and video data on the reply interface.

5. The method of claim 4, wherein the operable buttons further comprise buttons regarding the communication status that allow the user to record the audio data and video data, suspend the communication, or exit the communication.

6. The method of claim 1, wherein the request data packet is sent on condition that the outdoor intercom is activated by the visitor but receives no signal sent from the indoor intercom within a preset time.

7. The method of claim 1, wherein the network address is an IP address or a main access control (MAC) address of the electronic device, or a phone number of the electronic device if the electronic device is a mobile phone.

8. The method of claim 1, wherein the network device is installed with the indoor intercom or the outdoor intercom.

9. A non-transitory medium storing a set of instructions, the set of instructions capable of being executed by a processor of a processor of an electronic device to perform an intercom system controlling method, the method comprising:
 storing intercom system location information in a storage device of the electronic device, wherein: the intercom system location information comprises addresses and place names of buildings that comprise an intercom system, the intercom system comprising an indoor intercom positioned within a building, an outdoor intercom positioned at an entrance of the building, and an IP address of a network device of the intercom system;
 setting a reply interface, displayed on a screen of the electronic device, to provide different alert messages and operable buttons regarding different communication statuses between the intercom system and the electronic device;
 receiving a request data packet of a request to establish communication with the electronic device, wherein the request data packet is generated and sent by the network device of the intercom system, the request data packet comprising the IP address of the network device and a network address of the electronic device; and
 displaying the intercom system location information associated with an IP address of the network device contained in the request data packet, and corresponding alert messages and operable buttons on the reply interface.

10. The non-transitory medium of claim 9, wherein the different communication statuses between the intercom system and the electronic device comprise a waiting-for communication status before the electronic device accepts the request to establish the communication, and a communication status after the electronic device accepts the request to establish the communication.

11. The non-transitory medium of claim 10, wherein the operable buttons comprise buttons regarding the waiting-for communication status that allow the user to accept or refuse the request to establish the communication.

12. The non-transitory medium of claim 11, wherein the method further comprises:
 establishing the communication between the intercom system and the electronic device to enter into the communication status, in response that the electronic device accepts the request to establish the communication; and
 receiving audio data and video data of a visitor positioned at the entrance of the building which are captured and sent by the outdoor intercom, playing the audio data and video data on the reply interface.

13. The non-transitory medium of claim 12, wherein the operable buttons further comprise buttons regarding the communication status that allow the user to record the audio data and video data, suspend the communication, or exit the communication.

14. The non-transitory medium of claim 9, wherein the request data packet is sent on condition that the outdoor intercom is activated by the visitor but receives no signal sent from the indoor intercom within a preset time.

15. The non-transitory medium of claim 9, wherein the network address is an IP address or a main access control (MAC) address of the electronic device, or a phone number of the electronic device if the electronic device is a mobile phone.

16. The non-transitory medium of claim 9, wherein the network device is installed with the indoor intercom or the outdoor intercom.

* * * * *